(12) United States Patent
Hakura et al.

(10) Patent No.: US 9,336,002 B2
(45) Date of Patent: May 10, 2016

(54) DATA STRUCTURES FOR EFFICIENT TILED RENDERING

(71) Applicant: NVIDIA CORPORATION, Santa Clara, CA (US)

(72) Inventors: Ziyad S. Hakura, Gilroy, CA (US);
Pierre Souillot, Berkeley, CA (US);
Cynthia Allison, Madison, AL (US);
Dale L. Kirkland, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 227 days.

(21) Appl. No.: 13/967,233

(22) Filed: Aug. 14, 2013

(65) Prior Publication Data

US 2014/0118393 A1   May 1, 2014

Related U.S. Application Data

(60) Provisional application No. 61/719,271, filed on Oct. 26, 2012.

(51) Int. Cl.

| | |
|---|---|
| *G06T 1/60* | (2006.01) |
| *G06F 9/38* | (2006.01) |
| *G06T 15/00* | (2011.01) |
| *G06T 15/40* | (2011.01) |
| *G06T 1/20* | (2006.01) |
| *G09G 5/395* | (2006.01) |
| *G09G 5/00* | (2006.01) |
| *G06T 15/50* | (2011.01) |
| *G06F 12/08* | (2016.01) |

(Continued)

(52) U.S. Cl.
CPC .. *G06F 9/38* (2013.01); *G06F 9/44* (2013.01); *G06F 12/0808* (2013.01); *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G09G 5/003* (2013.01); *G09G 5/395* (2013.01); *G06F 2212/302* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 5,777,629 A | * | 7/1998 | Baldwin | .................. G06T 1/60 345/505 |
| 6,323,860 B1 | | 11/2001 | Zhu et al. | |

(Continued)

OTHER PUBLICATIONS

Non-Final Office Action for U.S. Appl. No. 13/967,212 dated Jul. 13, 2015.

*Primary Examiner* — Edward Martello
(74) *Attorney, Agent, or Firm* — Artegis Law Group, LLP

(57) ABSTRACT

One embodiment of the present invention includes a method for performing a multi-pass tiling test. The method includes combining a plurality of bounding boxes to generate a coarse bounding box. The method further includes identifying a first cache tile associated with a render surface and determining that the coarse bounding box intersects the first cache tile. The method further includes comparing each bounding box included in the plurality of bounding boxes against the first cache tile to determine that a first set of one or more bounding boxes included in the plurality of bounding boxes intersects the first cache tile. Finally, the method includes, for each bounding box included in the first set of one or more bounding boxes, processing one or more graphics primitives associated with the bounding box. One advantage of the disclosed technique is that the number of intersection calculations performed for each cache tile is reduced.

20 Claims, 13 Drawing Sheets

(51) Int. Cl.
*G06F 9/44* (2006.01)
*G06T 15/80* (2011.01)

(56) References Cited

U.S. PATENT DOCUMENTS

| | | | |
|---|---|---|---|
| 6,424,345 B1 | 7/2002 | Smith et al. | |
| 6,525,726 B1 * | 2/2003 | Xie | G06T 15/40 345/421 |
| 6,535,209 B1 | 3/2003 | Abdalla et al. | |
| 6,697,063 B1 | 2/2004 | Zhu et al. | |
| 7,023,437 B1 * | 4/2006 | Voorhies | G06T 15/005 345/419 |
| 7,170,515 B1 | 1/2007 | Zhu et al. | |
| 8,704,836 B1 | 4/2014 | Rhoades et al. | |
| 2002/0180748 A1 | 12/2002 | Popescu et al. | |
| 2010/0265254 A1 * | 10/2010 | Liland | G06T 11/40 345/441 |
| 2013/0076761 A1 * | 3/2013 | Ellis | G06F 15/16 345/502 |

* cited by examiner

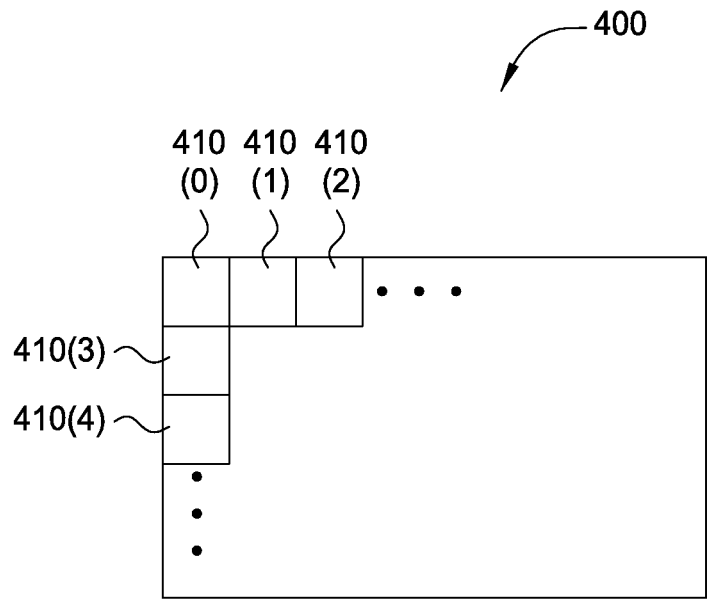
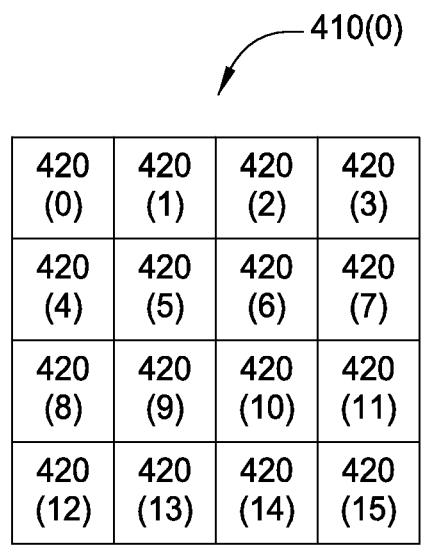
FIG. 4

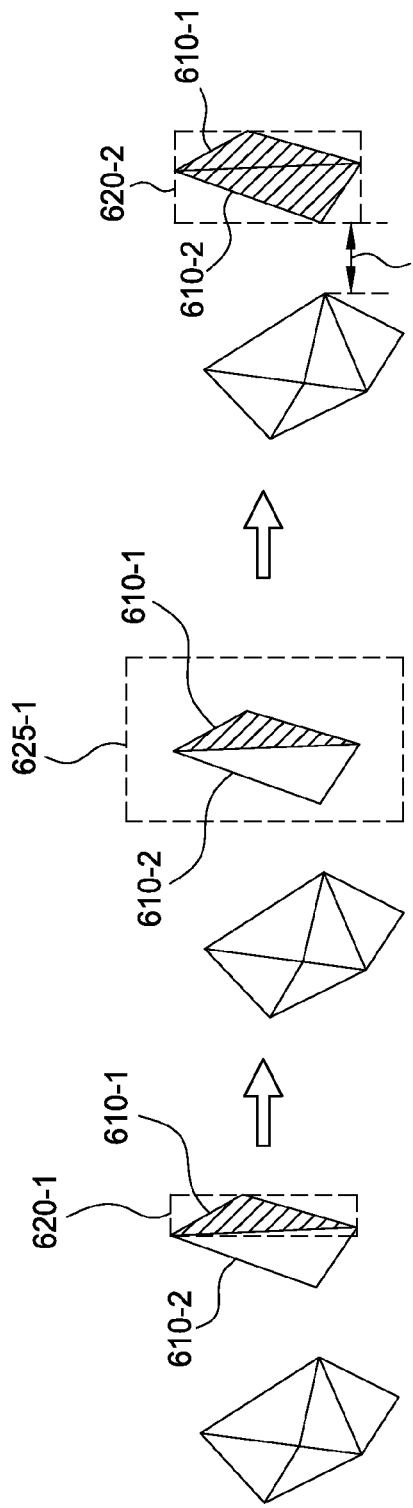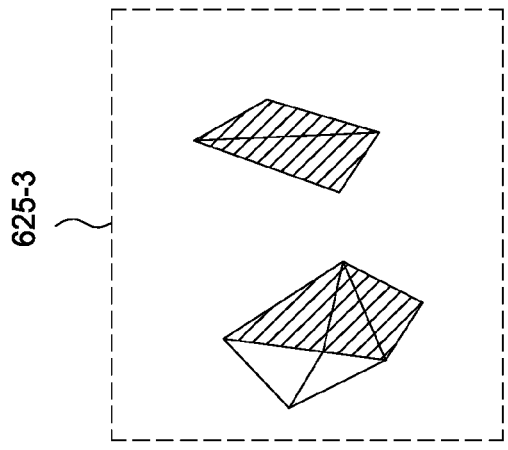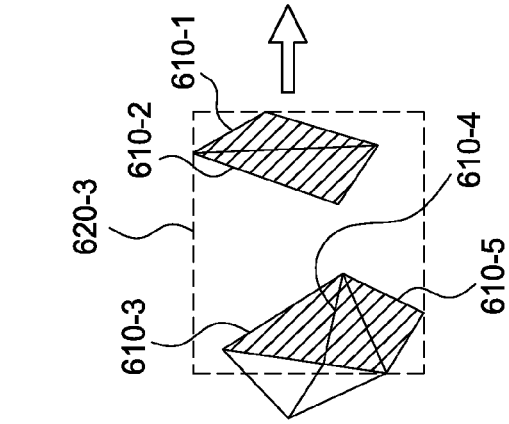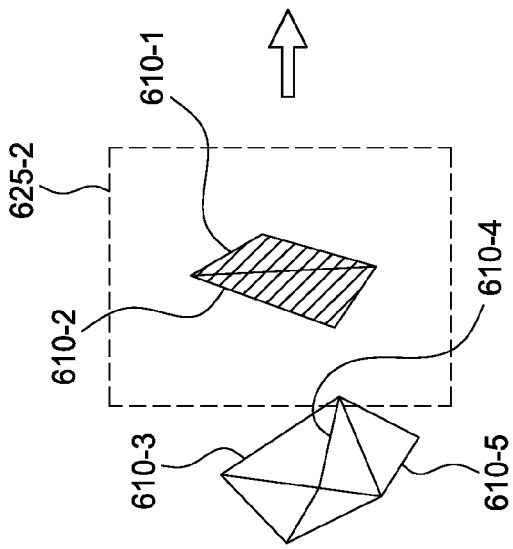

DATA STRUCTURES FOR EFFICIENT TILED RENDERING

CROSS-REFERENCE TO RELATED APPLICATIONS

This application claims benefit of U.S. provisional patent application Ser. No. 61/719,271, filed Oct. 26, 2012, and titled "An Approach for Tiled Caching." The subject matter of this related application is hereby incorporated herein by reference.

BACKGROUND OF THE INVENTION

1. Field of the Invention

Embodiments of the present invention relate generally to graphics processing and, more specifically, to data structures for efficient tiled rendering.

2. Description of the Related Art

Various graphics systems implement a tiling architecture that divides the screen-space into tiles and processes data associated with each tile in a particular order. That is, data associated with a first tile is processed first, data associated with a second tile is processed second, and so on. In such graphics systems, a highly parallel architecture may be implemented such that the work associated with one or more tiles is distributed to a plurality of processing units.

In one approach to distributing work in a highly parallel architecture, data is transferred from at least one world-space pipeline to multiple tiling units via a crossbar, where each tiling unit may be associated with a different screen-space pipeline. Although crossbars provide a high degree of flexibility when routing data, one drawback to implementing a crossbar is that overhead can be substantially increased and overall performance reduced if too much data is transmitted across the crossbar.

In addition, in many conventional tiled rendering systems, all geometry is typically tested against each tile to determine what, if any, geometry intersects the different tiles. One drawback to such an approach is that such testing is superfluous in cases where particular geometry does not intersect a given tile or when no geometry intersects a given tile. Consequently, conventional approaches to tiling may increase overhead and reduce overall performance too.

As the foregoing illustrates, what is needed in the art are ways to reduce the amount of data transmitted over a crossbar and increase the efficiency of tiling operations in a parallel tile-based architecture.

SUMMARY OF THE INVENTION

One embodiment of the present invention sets forth a method for performing a multi-pass tiling test. The method includes combining a plurality of bounding boxes to generate a coarse bounding box. The method further includes identifying a first cache tile associated with a render surface and determining that the coarse bounding box intersects the first cache tile. The method further includes comparing each bounding box included in the plurality of bounding boxes against the first cache tile to determine that a first set of one or more bounding boxes included in the plurality of bounding boxes intersects the first cache tile. Finally, the method includes, for each bounding box included in the first set of one or more bounding boxes, processing one or more graphics primitives associated with the bounding box.

One advantage of the disclosed technique is that, by analyzing the fine bounding boxes only after determining that the corresponding coarse bounding box intersects the current cache tile, the number of intersection calculations performed for each cache tile may be reduced. Additionally, coarse bounding boxes need to be generated only once and may be reused when visiting each cache tile during rendering, thereby increasing overall processing efficiency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a conceptual diagram of a cache tile that the graphics processing pipeline of FIG. 3B may be configured to generate and process, according to one embodiment of the present invention;

FIGS. 6A-6F are conceptual illustrations showing how an accumulated bounding box is generated, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
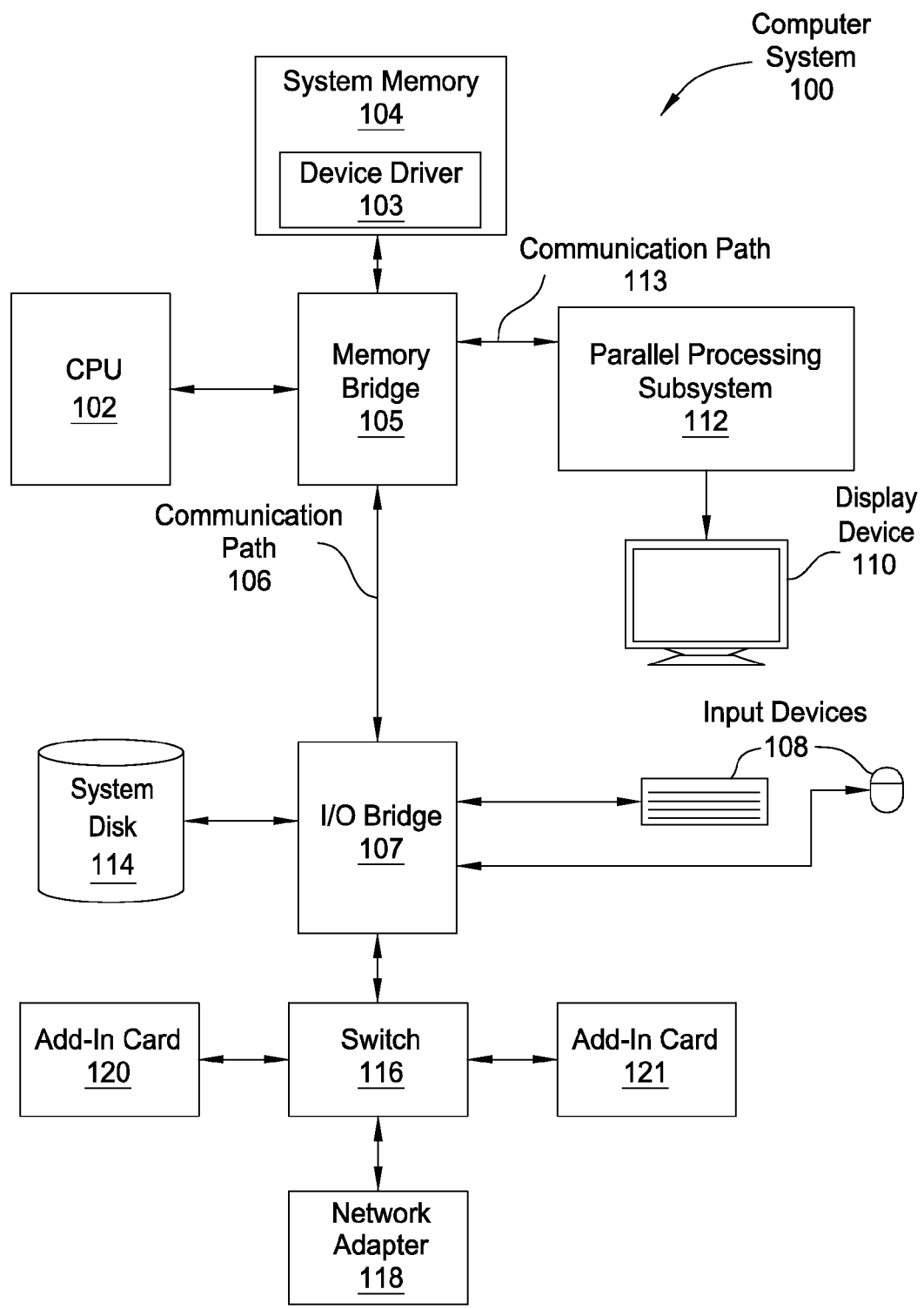
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
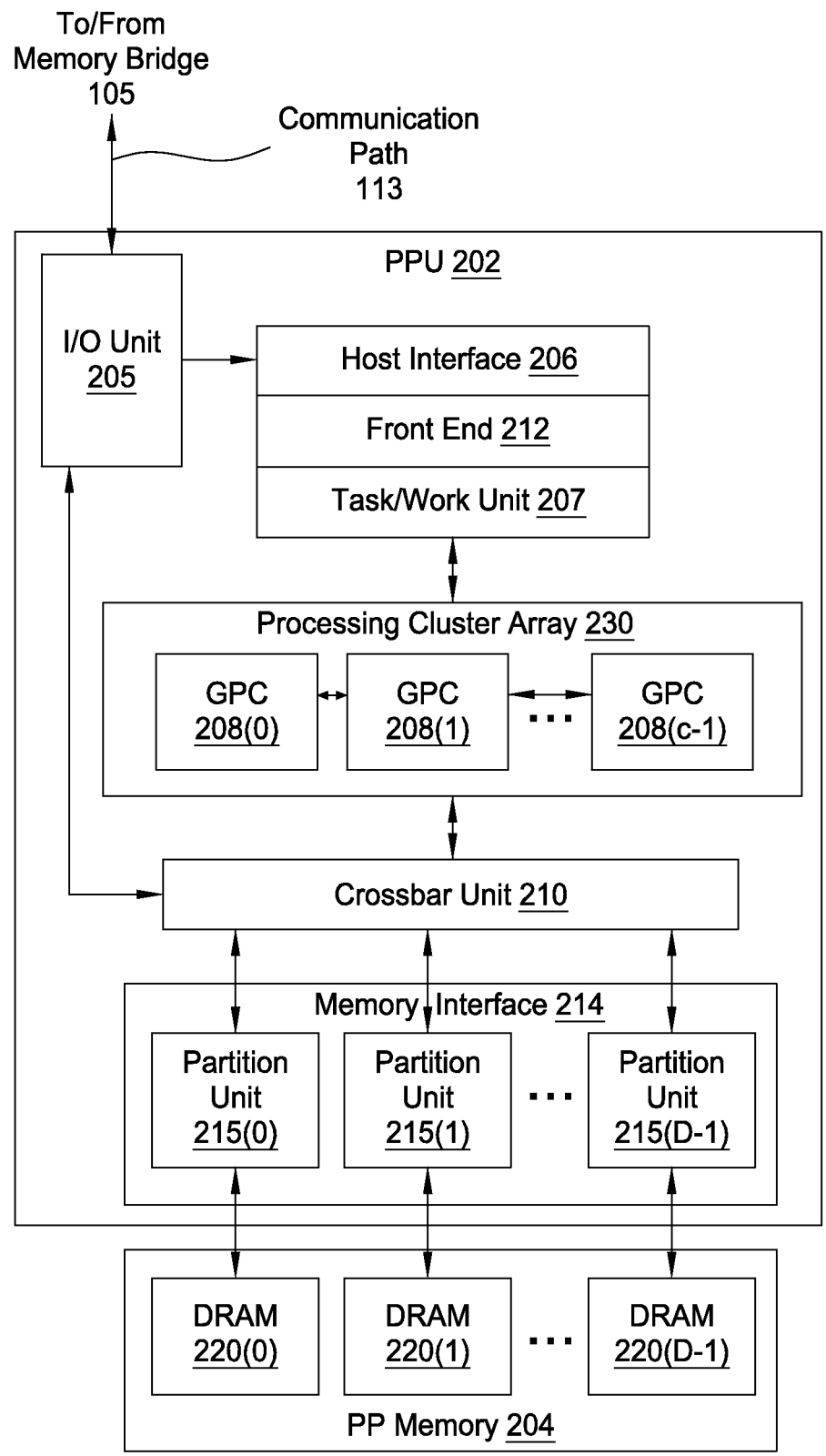
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
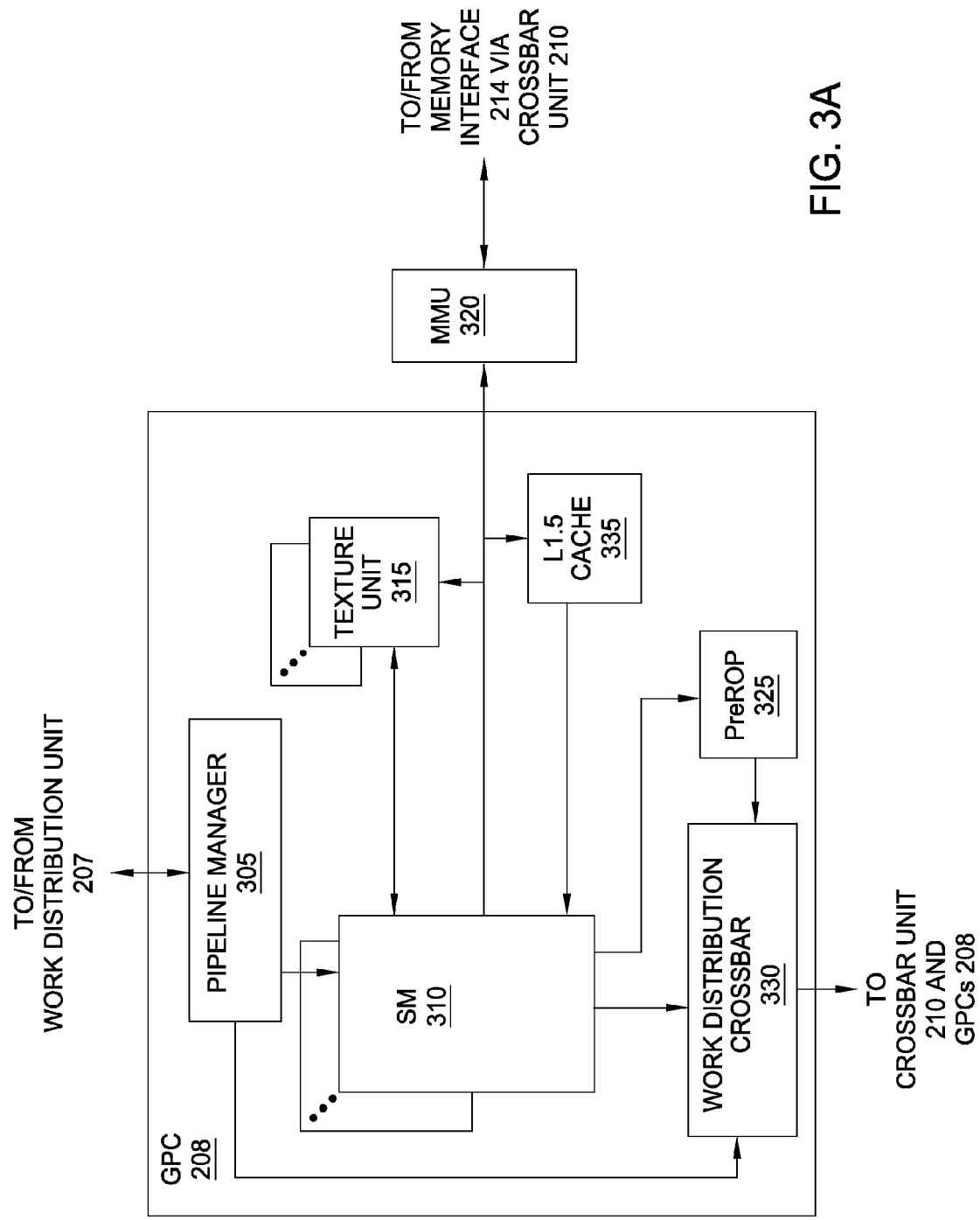
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
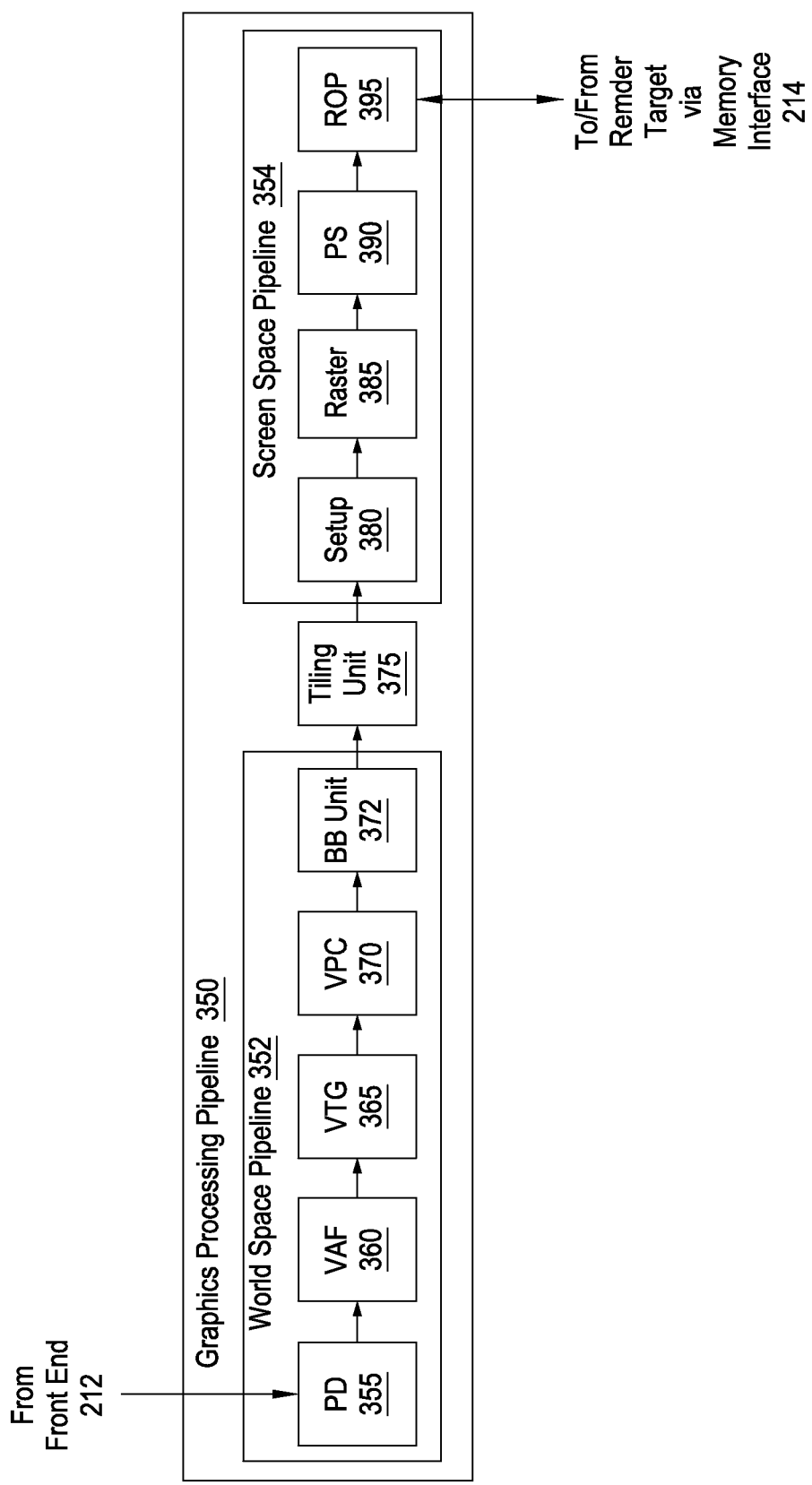
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives and their associated bounding boxes to a bounding box (BB) unit 372. The bounding box unit 372 combines the bounding boxes to generate one or more accumulated bounding boxes. The accumulated bounding boxes and graphics primitives are then transmitted to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." In order to determine the set of cache tiles that intersect a particular graphics primitive, the tiling unit 375 may use the associated bounding box and/or accumulated bounding box received from the bounding box unit 372. After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipelines 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

During tiled rendering, the tiling unit 375 transmits graphics primitives associated with each cache tile 410 to the setup unit 380 for processing in the screen space pipeline 354. In order to determine whether a particular graphics primitive intersects a particular cache tile 410, the tiling unit 375 performs an intersection test between the cache tile 410 and a bounding box associated with the graphics primitive. If the bounding box intersects the cache tile 410, then the graphics primitive may intersect the cache tile 410, and the graphics primitive is transmitted to the screen space pipeline 354 for further processing. If the bounding box does not intersect the cache tile 410, then the graphics primitive does not intersect the cache tile 410, and the graphics primitive is not transmitted to the screen space pipeline 354.

The VPC 370 generates a bounding box for each graphics primitive near the end of the world space pipeline 352. Accordingly, instead of re-computing a bounding box for each graphics primitive during tiled rendering, bounding boxes generated in the world space pipeline 352 may be transmitted from the VPC 370 to the tiling unit 375 via crossbar unit 220.

Adaptively Generating Bounding Boxes

Each bounding box includes a substantial number of bits that specify the (x,y) coordinates of the upper left corner, upper right corner, lower left corner, and lower right corner of the bounding box. Consequently, transmitting a bounding box through the crossbar unit 220 for each graphics primitive sent to the screen space pipeline 354 would significantly increase processing overhead. Additionally, when processing associated with a given cache tile 410 is divided among multiple GPCs 208, each bounding box that intersects more than one raster tile 420 may be transmitted over the crossbar unit 220 multiple times, further increasing processing overhead. As such, when the bounding boxes are transmitted from the world space pipeline 352 to the tiling unit 375, a bounding box (BB) unit 372 may generate one or more accumulated bounding boxes, each of which is associated multiple graphics primitives. The accumulated bounding boxes are then transmitted to the tiling unit 375, reducing the processing overhead associated with transmitting bounding boxes through the crossbar unit 220.

Determining whether to add a particular bounding box to an accumulated bounding box may be based on a variety of criteria. In one implementation, determining whether to add a bounding box to an accumulated bounding box is based on whether the bounding box (or the graphics primitive associated with bounding box) is within a threshold distance of the accumulated bounding box. One such proximity-based technique for generating accumulated bounding boxes is described below in conjunction with FIGS. 5-8C.

Figure 5:
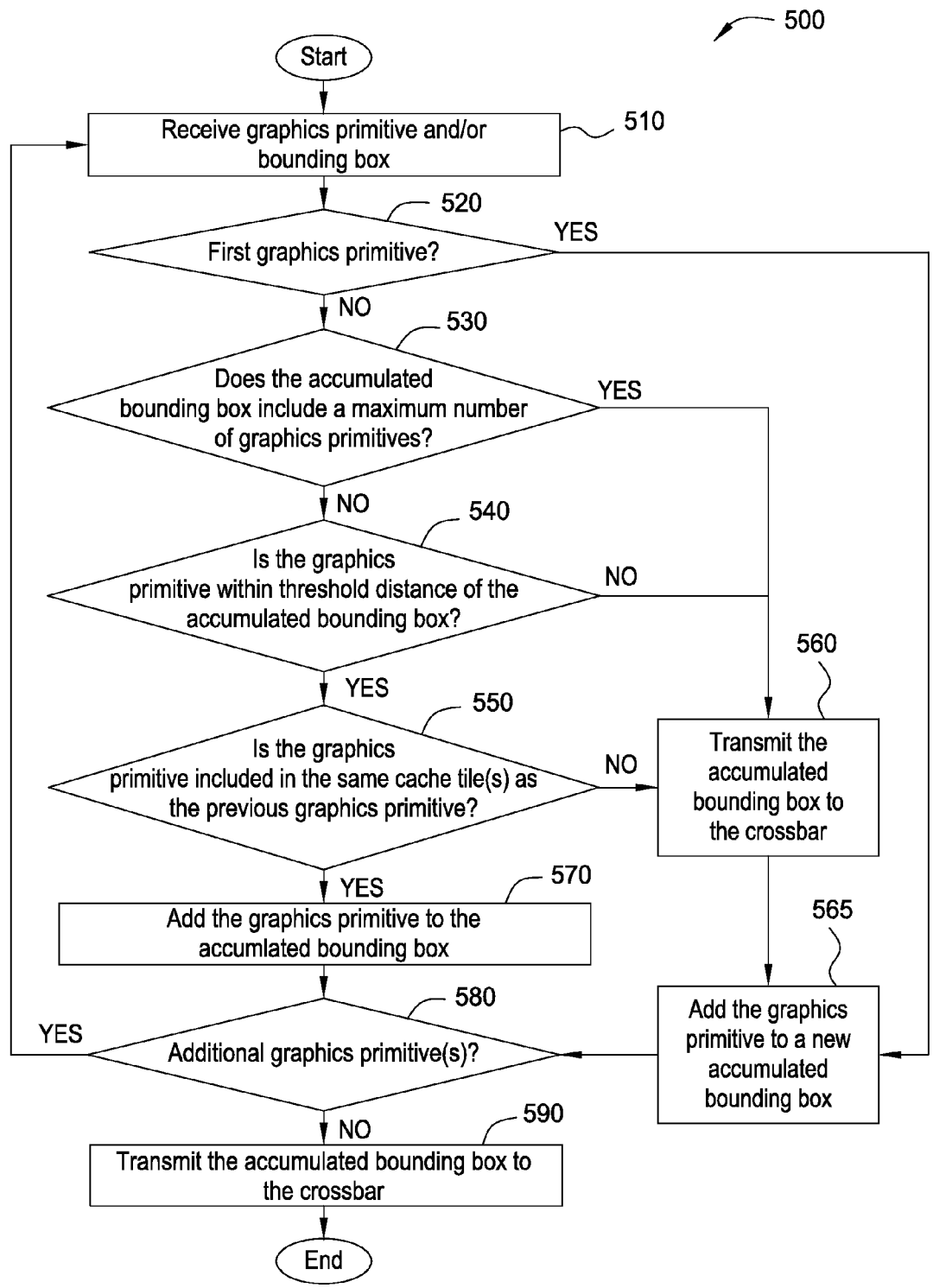
FIG. 5 is a flow diagram of method steps for generating accumulated bounding boxes, according to one embodiment of the present invention.

FIG. 5 is a flow diagram of method steps for generating accumulated bounding boxes, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 500 begins at step 510, where the bounding box unit 372 receives a graphics primitive and/or a bounding box associated with the graphics primitive from the VPC 370. At step 520, the bounding box unit 372 determines whether the graphics primitive is the first graphics primitive that has been received by the bounding box unit 372 for the current tiled rendering pass. If the graphics primitive is the first graphics primitives received by the bounding box unit 372, then, at step 565, a new accumulated bounding box is generated based on the bounding box associated with the graphics primitive. The method 500 then proceeds to step 580, where the bounding box unit 372 determines whether additional graphics primitives and/or bounding boxes are to be received. If additional graphics primitives and/or bounding boxes are to be received, then the method 500 returns to step 510, and the new accumulated bounding box is designated as the current accumulated bounding box.

If the graphics primitive is not the first graphics primitives received by the bounding box unit 372 for the current set of graphics primitives, then, at step 530, the bounding box unit 372 next determines whether the current accumulated bounding box includes a maximum number of graphics primitives. The maximum number of graphics primitives included in a single accumulated bounding box can be any number. In one example, the maximum number of graphics primitives included in a single accumulated bounding box is 8 graphics primitives. In other examples, the maximum number of graphics primitives included in a single accumulated bounding box may be 16 or 32 graphics primitives. In general, if too few graphics primitives are added to each accumulated bounding box, then a greater number of bounding boxes are transferred through the crossbar unit 220, thereby increasing processing overhead. However, if too many graphics primitives are added to each accumulated bounding box, then the accumulated bounding box may provide too coarse an estimation of which cache tiles 410 are intersected by the graphics primitives included in the accumulated bounding box. In the latter case, if the accumulated bounding box does not provide an accurate estimation of which cache tiles 410 are intersected by the associated graphics primitives, then the tiling unit 375 may process the accumulated bounding box with respect to cache tiles 410 that are not intersected by the graphics primitives, thereby decreasing processing efficiency.

If the current accumulated bounding box includes the maximum number of graphics primitives, then, at step 560, the bounding box unit 372 transmits the current accumulated bounding box to the tiling unit 375 via the crossbar unit 220. At step 565, the bounding box unit 372 generates a new accumulated bounding box based on the bounding box associated with the graphics primitive. However, if the current accumulated bounding box does not include the maximum number of graphics primitives, then, at step 540, the bounding box unit 372 next determines whether the graphics primitive is within a threshold distance of the accumulated bounding box.

Turning now to FIGS. 6A-6F, an exemplary technique for determining whether a graphics primitive is within a threshold distance of an accumulated bounding box is provided. These figures are conceptual illustrations showing how an accumulated bounding box is generated, according to one embodiment of the present invention. As shown in FIGS. 6A and 6B, to determine whether graphics primitive 610-2 is within a threshold distance of an accumulated bounding box 620-1, the bounding box unit 372 may increase one or more dimensions of the accumulated bounding box 620-1 to generate an expanded bounding box 625-1. The bounding box unit 372 then determines whether the graphics primitive 610-2 (or the bounding box associated with the graphics primitive 610-2) intersects the expanded bounding box 625-1.

Expanding the accumulated bounding box 620-1 to generate an expanded bounding box 625-1 may include increasing one or more dimensions of the accumulated bounding box 620-1 by a number of pixels. The one or more dimensions may be increased by any number of pixels. In one example, the one or more dimensions may be increased by approximately 5 to 10 pixels. In another embodiment, the accumulated bounding box 620-1 may be expanded by increasing a dimension of the accumulated bounding box 620-1 by a percentage. For example, the width and/or height of the accumulated bounding box 620-1 may be expanded by 10% to generate the expanded bounding box 625-1.

If the graphics primitive 610-2 is within the threshold distance of the accumulated bounding box (e.g., by intersecting the expanded bounding box 625-1), then, contingent upon step 550, the graphics primitive 610-2 may be added to the accumulated bounding box 620-1 at step 570 to generate accumulated bounding box 620-2. For example, as shown in FIGS. 6D-6F, the bounding box unit 372 may perform additional expansion iterations to determine that graphics primitives 610-3, 610-4, and 610-5 are within a threshold distance of the accumulated bounding box 620-2. If the graphics primitive 610-2 was not within the threshold distance of the accumulated bounding box (e.g., did not intersect the expanded bounding box 625-1), then, at step 560, the bounding box unit 372 would transmit the current accumulated bounding box 620-1 to the tiling unit 375 via the crossbar unit 220 and, at step 565, would add the graphics primitive 610-2 to a new accumulated bounding box.

In one implementation, graphics primitives are added to each accumulated bounding box in an application programming interface (API) order. For example, with reference to FIGS. 6A-6F, the API order of the graphics primitives may be 610-1, 610-2, 610-3, 610-4, and 610-5.

In other embodiments, instead of determining whether a particular graphics primitive intersects an expanded bounding box 625-1, the bounding box unit 372 determines whether a distance 630 between the accumulated bounding box 620-1 and the graphics primitive(s) 610 (e.g., 610-3) is less than a threshold value. Alternatively, the bounding box unit 372 may determine whether a distance between the accumulated bounding box 620-1 and a bounding box associated with the graphics primitive 610 (e.g., 610-3) is less than a threshold distance. In yet another embodiment, the bounding box unit 372 may determine whether the distance between two graphics primitives—for example, the distance between graphics primitive 610-2 and graphics primitive 610-3—is less than a threshold distance.

Returning now to the method 500 of FIG. 5, if the graphics primitive is within the threshold distance of the accumulated bounding box, then, at step 550 (optional), the bounding box unit 372 next determines whether the graphics primitive is included in the same cache tile(s) 410 as the previous graphics primitive added to the current accumulated bounding box. If the graphics primitive is included in the same cache tile(s) 410 as the previous graphics primitive, then, at step 570, the bounding box unit 372 adds the graphics primitive to the accumulated bounding box. If the graphics primitive is not included in the same cache tile(s) 410 as the previous graphics primitive, then, at step 560, the bounding box unit 372 transmits the current accumulated bounding box to the tiling unit 375 via the crossbar unit 220, and, at step 565, adds the graphics primitive to a new accumulated bounding box. At step 580, the bounding box unit 372 determines whether additional graphics primitives are to be received. If additional graphics primitives are to be received by the bounding box unit 372, then the method 500 returns to step 510, as previously described herein. If no additional graphics primitives are to be received by the bounding box unit 372, then, at step 590, the bounding box unit 372 transmits the current accumulated bounding box to the tiling unit 375 via the crossbar unit 220, and the method 500 ends.

Determining whether a particular graphics primitive intersects the same cache tile(s) 410 as the other graphics primitives included in an accumulated bounding box increases the likelihood that all graphics primitives included in an accumulated bounding box will be located in a similar region of the screen space 400. Consequently, during tiled rendering of a particular cache 410, each accumulated bounding box transmitted to the screen space pipeline 354 is less likely to contain graphics primitives that do not intersect the cache tile 410, thereby increasing processing efficiency. Further, by performing step 550, the bounding box unit 372 may more effectively divide strips of closely-spaced graphics primitives—that may span multiple cache tiles 410—between multiple accumulated bounding boxes, such that the graphics primitives included in each accumulated bounding box are more closely associated with a single cache tile 410.

Figure 7A:
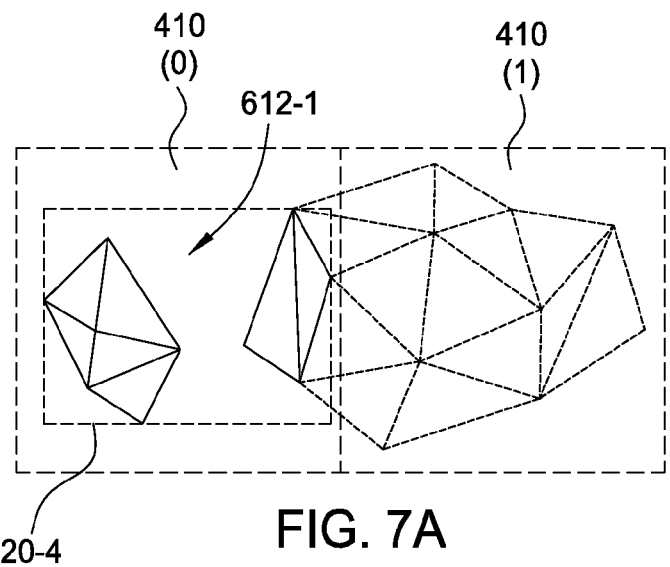
FIGS. 7A-7C illustrate accumulated bounding boxes generated for a plurality of graphics primitives included in two cache tiles, according to one embodiment of the present invention.
Figure 7B:
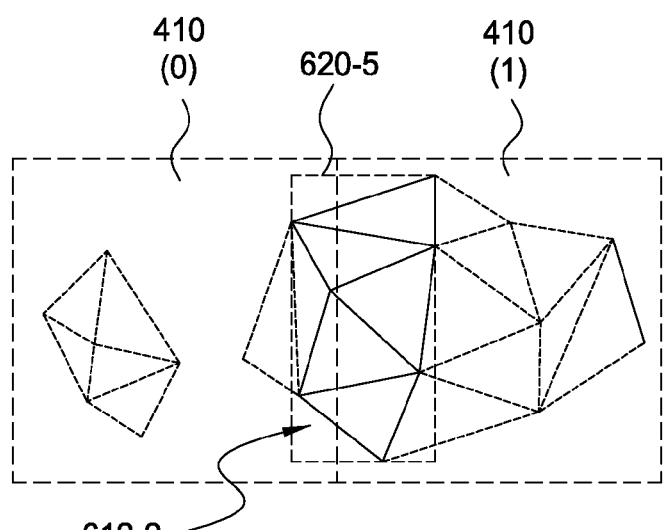
Figure 7C:
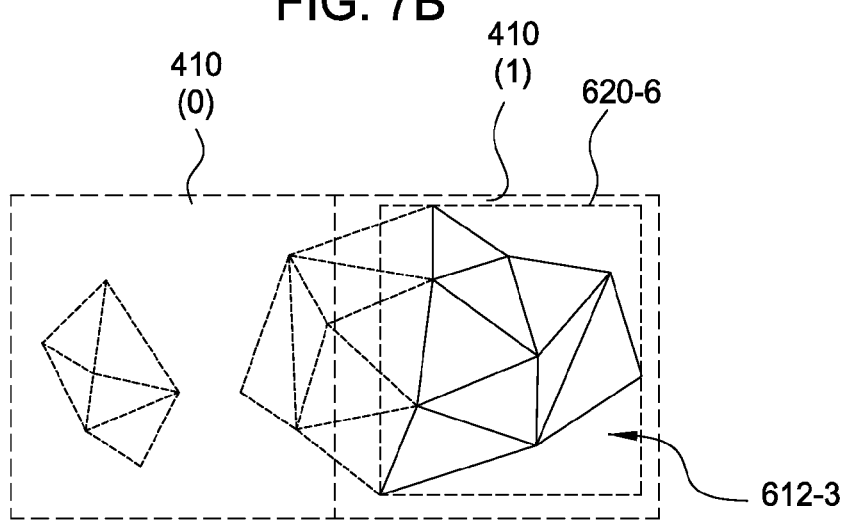

One example of the above technique is shown in FIGS. 7A-7C, which illustrate accumulated bounding boxes generated for a plurality of graphics primitives included in two cache tiles, according to one embodiment of the present invention. As shown in FIGS. 7A-7C, a first plurality of graphics primitives 612-1 have been added to a first accumulated bounding box 620-4, a second plurality of graphics primitives 612-2 have been added to a second accumulated bounding box 620-5, and a third plurality of graphics primitives 612-3 have been added to a third accumulated bounding box 620-6. As such, the first plurality of graphics primitives 612-1 are transmitted to the setup unit 380 only when tiled rendering is performed with respect to cache tile 410(0), and the third plurality of graphics primitives 612-3 are transmitted to the setup unit 380 only when tiled rendering is performed with respect to cache tile 410(1). Moreover, the second plurality of graphics primitives 612-2 are transmitted to the setup unit 380 when tiled rendering is performed with respect to cache tile 410(0) and cache tile 410(1). However, none of the graphics primitives included in the third plurality of graphics primitives 612-3 are transmitted to the setup unit 380 when tiled rendering is performed with respect to cache tile 410(0), and none of the graphics primitives included in the first plurality of graphics primitives 612-1 are transmitted to the setup unit 380 when tiled rendering is performed with respect to cache tile 410(1). Accordingly, by determining whether each graphics primitive intersects the same cache tile(s) 410 as the previous graphics primitive at step 550, the efficiency with which each cache tile 410 is processed may be increased.

Data Structures for Efficient Tiled Rendering

After accumulated bounding boxes are generated by the bounding box unit 372, each accumulated bounding box and the associated graphics primitives are transmitted to the tiling unit 375 and stored in a buffer memory. Upon receiving each accumulated bounding box, the tiling unit 375 tracks which cache tile(s) 410 are intersected by the accumulated bounding box and stores the result(s) in an array. The array is then referenced during tiled rendering of each cache tile 410, enabling the tiling unit 375 to quickly determine whether a particular cache tile 410 is intersected by any of the accumulated bounding boxes and/or graphics primitives currently stored in the buffer memory. If the array indicates that none of the accumulated bounding boxes stored in the buffer memory intersect a particular cache tile 410, then none of the graphics primitives stored in the buffer memory intersect the cache tile 410 (i.e., the cache tile 410 is empty), and the cache tile 410 can be skipped with respect to the current tiled rendering pass. Thus, by skipping empty cache tiles 410 during tiled rendering, the processing overhead associated with determining whether each accumulated bounding box intersects the empty cache tiles 410 is reduced. Various implementations of this technique are described below in further detail in conjunction with FIGS. 8-9B.

Figure 8:
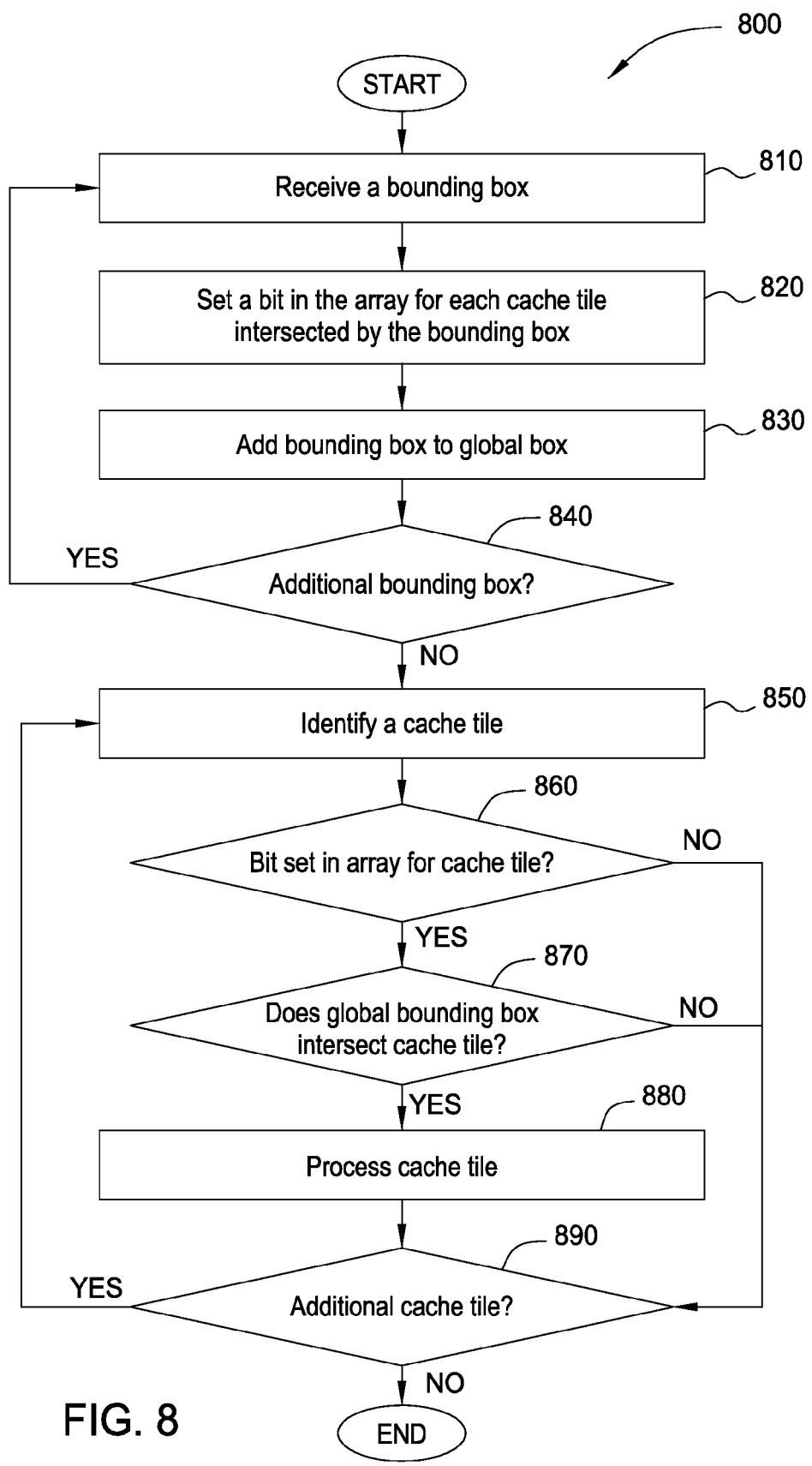
FIG. 8 is a flow diagram of method steps for determining whether a cache tile includes no graphics primitives, according to one embodiment of the present invention.

FIG. 8 is a flow diagram of method steps for determining whether a cache tile 410 includes no graphics primitives, according to one embodiment of the present invention. Although the method steps are described in conjunction with the systems of FIGS. 1-4, persons skilled in the art will understand that any system configured to perform the method steps, in any order, falls within the scope of the present invention. Additionally, although the method steps are described in conjunction with accumulated bounding boxes received from the bounding box unit 372, the method steps are applicable to any type of bounding box generated in, or received by, any graphics processing pipeline.

Figure 9A:
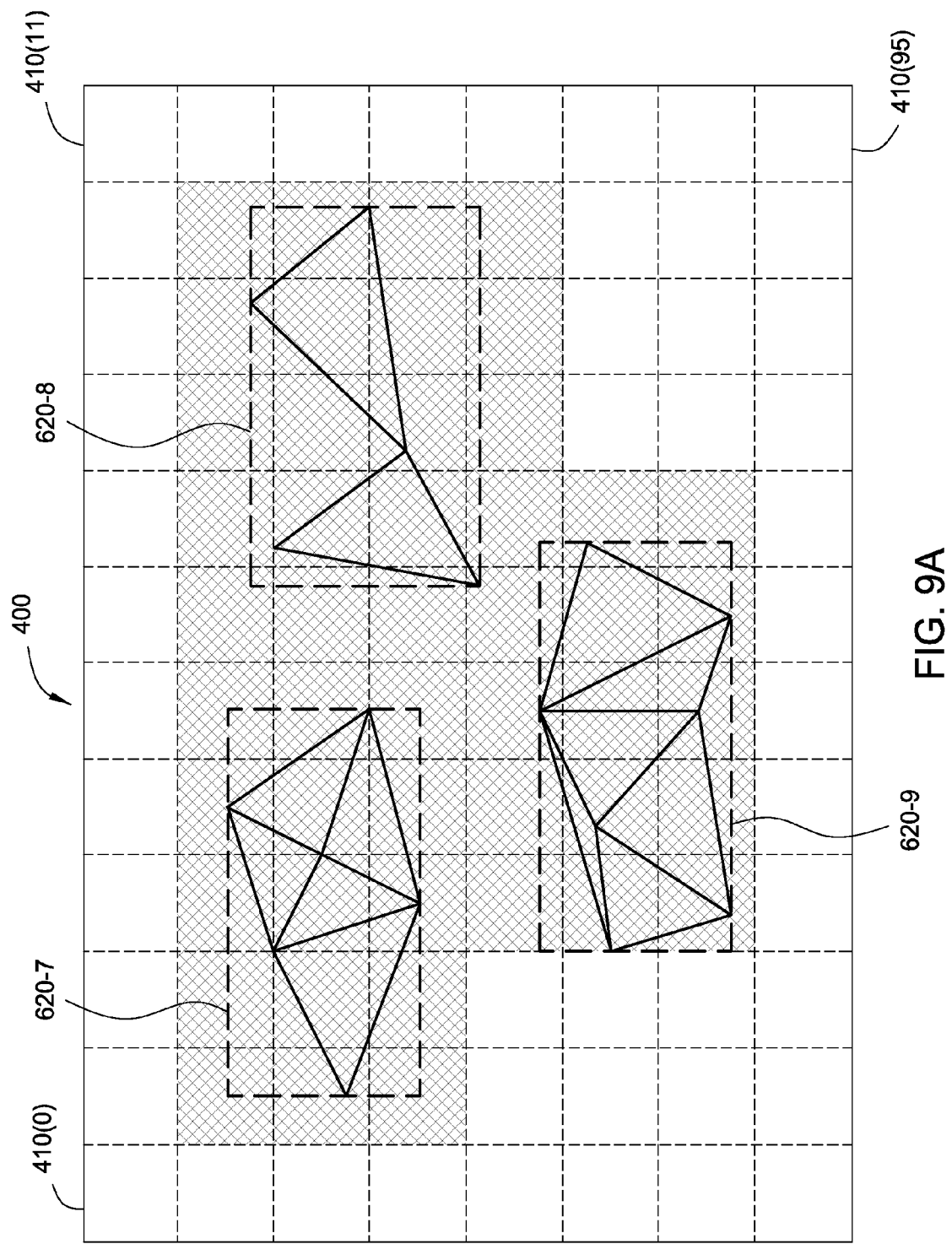
FIG. 9A is a conceptual illustration showing how to determine whether an accumulated bounding box intersects a cache tile, according to one embodiment of the present invention.

As shown, a method 800 begins at step 810, where the tiling unit 375 receives an accumulated bounding box from the bounding box unit 372. At step 820, the tiling unit 375 determines which cache tile(s) 410 are intersected by the accumulated bounding box. The tiling unit then stores a result in an array based on each cache tile 410 intersected by the accumulated bounding box. For example, the tiling unit 375 may determine that an accumulated bounding box 620-7 intersects a plurality of cache tiles 410, as shown in FIG. 9A, which is a conceptual illustration showing how to determine whether an accumulated bounding box intersects a cache tile 410, according to one embodiment of the present invention. The tiling unit 375 then stores one or more results in the array that indicate the 15 cache tiles 410 intersected by the accumulated bounding box 620-7. Please note that, in FIG. 9A, the sizes of the accumulated bounding boxes 620 and the sizes of the graphics primitives relative to the size the cache tiles 410 have been exaggerated for clarity of explanation.

The tiling unit 375 may store results that indicate which cache tiles 410 are intersected by accumulated bounding boxes in variety of ways. In one implementation, each location in the array is associated with a single cache tile 410. In this implementation, the tiling unit 375 sets a bit in the array for each cache tile 410 that is intersected by an accumulated bounding box stored in the buffer memory.

One potential obstacle to mapping each cache tile 410 to a different location in the array is that, if the screen space 400 is divided into a large number of cache tiles 410, such as at high display resolutions, mapping each cache tile 410 to a different location would require a prohibitively large array. To address this issue, a single bit in the array may serve as an alias for more than one cache tile 410. For example, if the screen space 400 is divided into 128×72 cache tiles 410, and the dimensions of the array are set at 64×32 bits, then the tiling unit 375 would store a result for the 65th cache tile 410(64) in the same location in the array at which a result for the 1st cache tile 410(0) would be stored. That is, starting at the 65th tile, the tiling unit 375 would wrap around the array and start again at the first bit location. To further illustrate this technique, the tiling unit 375 would store a result for the 66th cache tile 410(65) in the same location in the array at which a result for the 2nd cache tile 410(1) would be stored, store a result for the 67th cache tile 410(66) in the same location in the array at which a result for the 3rd cache tile 410(2) would be stored, and so on. Additionally, although each example provided above includes two cache tiles 410 aliased to a single bit in the array, three of more cache tiles 410 may be aliased to a single bit. For example, three cache tiles 410 may be aliased to a single bit in the array such that a particular number of cache tiles 410 is disposed between the first cache tile 410 and the second cache tile 410, and that particular number of cache tiles 410 is disposed between the second cache tile 410 and the third cache tile 410. Further, the number of cache tiles 410 disposed between the aliased cache tiles 410 may be based on a dimension of the array.

The same wrapping technique may be applied when traversing the cache tiles 410 in the vertical direction. For example, starting at the 2049th cache tile 410 (2048) (i.e., the cache tile 410 in the 33rd row, 1st column), the tiling unit 375 would wrap around the array and start again at the first bit location. Thus, the tiling unit 375 would store a result for the 2049th cache tile 410 (2048) in the same location in the array at which a result for the 1st cache tile 410(0) would be stored. Although an array having 64×32 bits was used in the examples described above, the tiling unit 375 may use an array having any size and dimensions. Additionally, the array may be implemented with or without cache tile 410 aliasing.

One consequence of aliasing multiple cache tiles 410 to a single location in the array is that, when at least one, but not all, of the multiple cache tiles 410 is intersected by an accumulated bounding box stored in the buffer memory, then the tiling unit 375 cannot determine which cache tiles 410 are empty by referencing the array. Accordingly, at step 830, after storing a result for each cache tile 410 intersected by the accumulated bounding box, the tiling unit 375 adds the accumulated bounding box to a global bounding box 910.

Figure 9B:
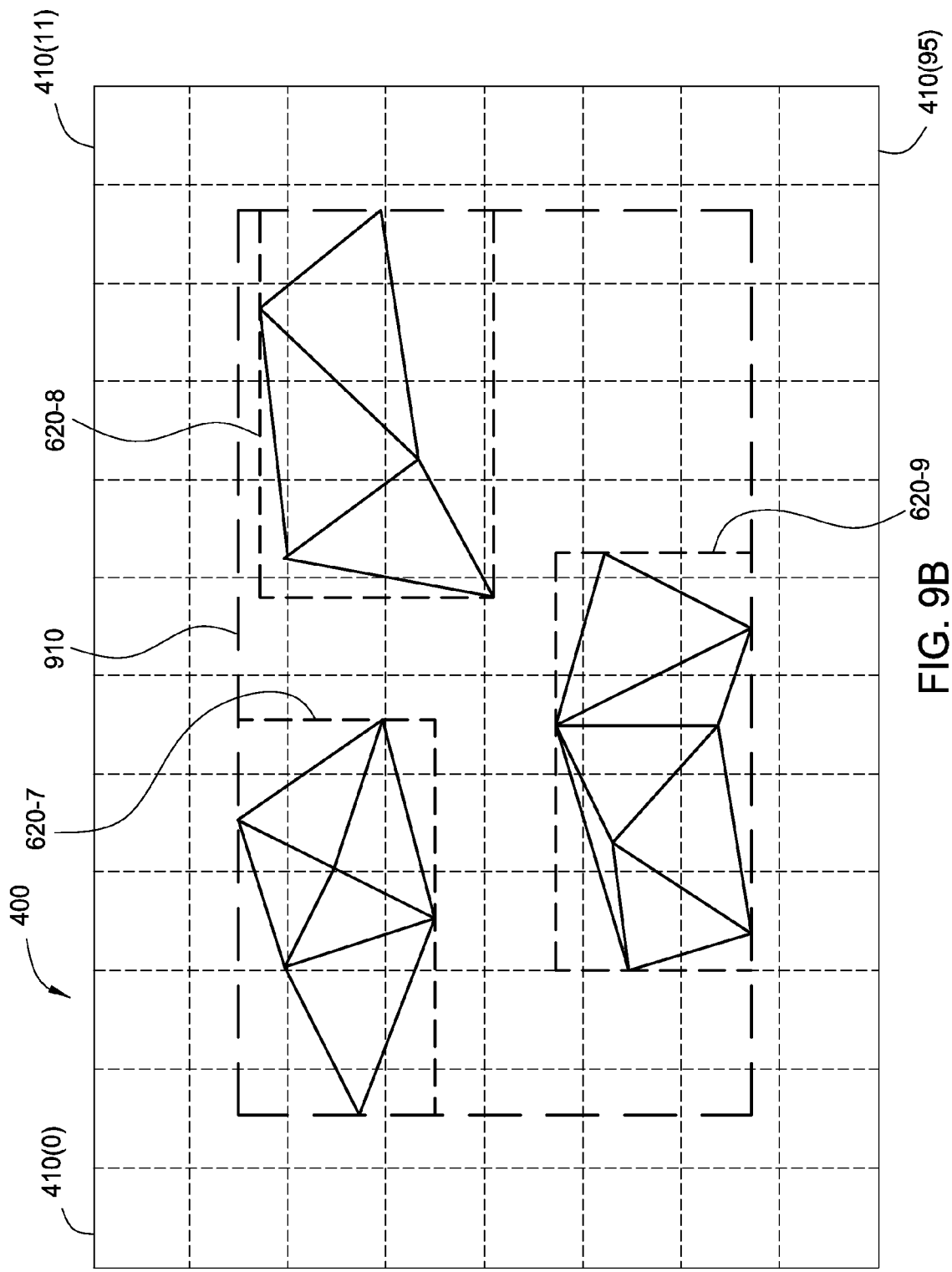
FIG. 9B is a conceptual illustration showing how a global bounding box is generated from the accumulated bounding boxes of FIG. 9A, according to one embodiment of the present invention.

Turning now to FIG. 9B, an exemplary global bounding box 910 is provided. FIG. 9B is a conceptual illustration showing how a global bounding box 910 is generated from the accumulated bounding boxes of FIG. 9A, according to one embodiment of the present invention. During tiled rendering, if the array indicates that one or more accumulated bounding boxes stored in the buffer memory intersect a particular cache tile 410, the tiling unit 375 then further determines whether the global bounding box 910 intersects the cache tile 410. As shown in FIG. 9B, if the global bounding box 910 does not intersect the cache tile 410, then the cache tile 410 is empty. If the global bounding box 910 intersects the cache tile 410, then one or more accumulated bounding boxes stored in the buffer memory may (or may not) intersect the cache tile 410.

At step 840, the tiling unit 375 determines whether an additional accumulated bounding box has been received from the world space pipeline 352. If an additional accumulated bounding box has been received, then steps 810, 820 and 830 are repeated. If an additional accumulated bounding box is not received, then the tiling unit 375 begins the process of tiled rendering at step 850 by identifying a cache tile 410 for which the accumulated bounding boxes and graphics primitives currently stored in the buffer memory are to be processed.

Next, at step 860, the tiling unit 375 determines whether a result is stored in the array indicating that the cache tile 410 is intersected by an accumulated bounding box stored in the buffer memory. If the tiling unit 375 determines that a result is not stored for the cache tile 410, then the cache tile 410 is empty, and the cache tile 410 is skipped with respect to the current tiled rendering pass. The tiling unit 375 then proceeds to step 890 and determines whether to identify an additional cache tile 410. If the tiling unit 375 determines that a result is stored for the cache tile 410, then, if the array implements cache tile 410 aliasing, then, at step 870, the tiling unit 375 further determines whether the global bounding box 910 intersects the cache tile 410. If the global bounding box 910 does not intersect the cache tile 410, then the cache tile 410 is empty, and the cache tile 410 is skipped with respect to the current tiled rendering pass. If the global bounding box 910 intersects the cache tile 410, then, at step 880, the tiling unit 375 processes the cache tile 410. During processing of the cache tile 410, the tiling unit 375 may determine whether each accumulated bounding box stored in the buffer memory intersects the cache tile 410. The tiling unit 375 may then send one or more graphics primitives associated with the accumulated bounding boxes that intersect the cache tile 410 to the screen space pipeline 354, as described below in further detail with respect to FIGS. 10 and 11.

Finally, at step 890, the tiling unit 375 determines whether to identify an additional cache tile 410. If an additional cache tile 410 is to be identified, then the tiling unit 375 returns to step 850. If no additional cache tiles 410 are to be identified, then the method 800 ends. Additionally, after each cache tile 410 has been processed with respect to the current tiled rendering pass, the results stored in the array may be cleared, and, at step 810, the next batch of accumulated bounding boxes and graphics primitives may be received by the tiling unit 375 and stored in the buffer memory.

Generating and Processing Bounding Box Hierarchies

During tiled rendering, the tiling unit 375 determines whether each accumulated bounding box stored in the buffer memory intersects a particular cache tile 410. If the accumulated bounding box intersects the cache tile 410, then the graphics primitives associated with the accumulated bounding box are transmitted to the screen space pipeline for further processing. However, since the buffer memory may store a large number of accumulated bounding boxes, determining whether each accumulated bounding box stored in the buffer memory intersects each cache tile 410 may significantly increase processing overhead. Accordingly, upon receiving accumulated bounding boxes from the world space pipeline (e.g., at step 810 in the method 800 of the FIG. 8), the tiling unit 375 may combine the accumulated bounding boxes to generate one or more coarse bounding boxes. Then, during tiled rendering, instead of determining whether each accumulated bounding box stored in the buffer memory intersects a particular cache tile 410, the tiling unit 375 first determines whether each coarse bounding box intersects the cache tile 410. That is, if the tiling unit 375 determines that a coarse bounding box intersects the cache tile 410, then tiling unit 375 further determines whether the accumulated bounding boxes associated with the coarse bounding box intersect the cache tile 410. On the other hand, if the tiling unit 375 determines that a coarse bounding box does not intersect the cache tile 410, then the accumulated bounding boxes associated with the coarse bounding box are skipped, as described below in further detail in conjunction with FIG. 10.

Figure 10:
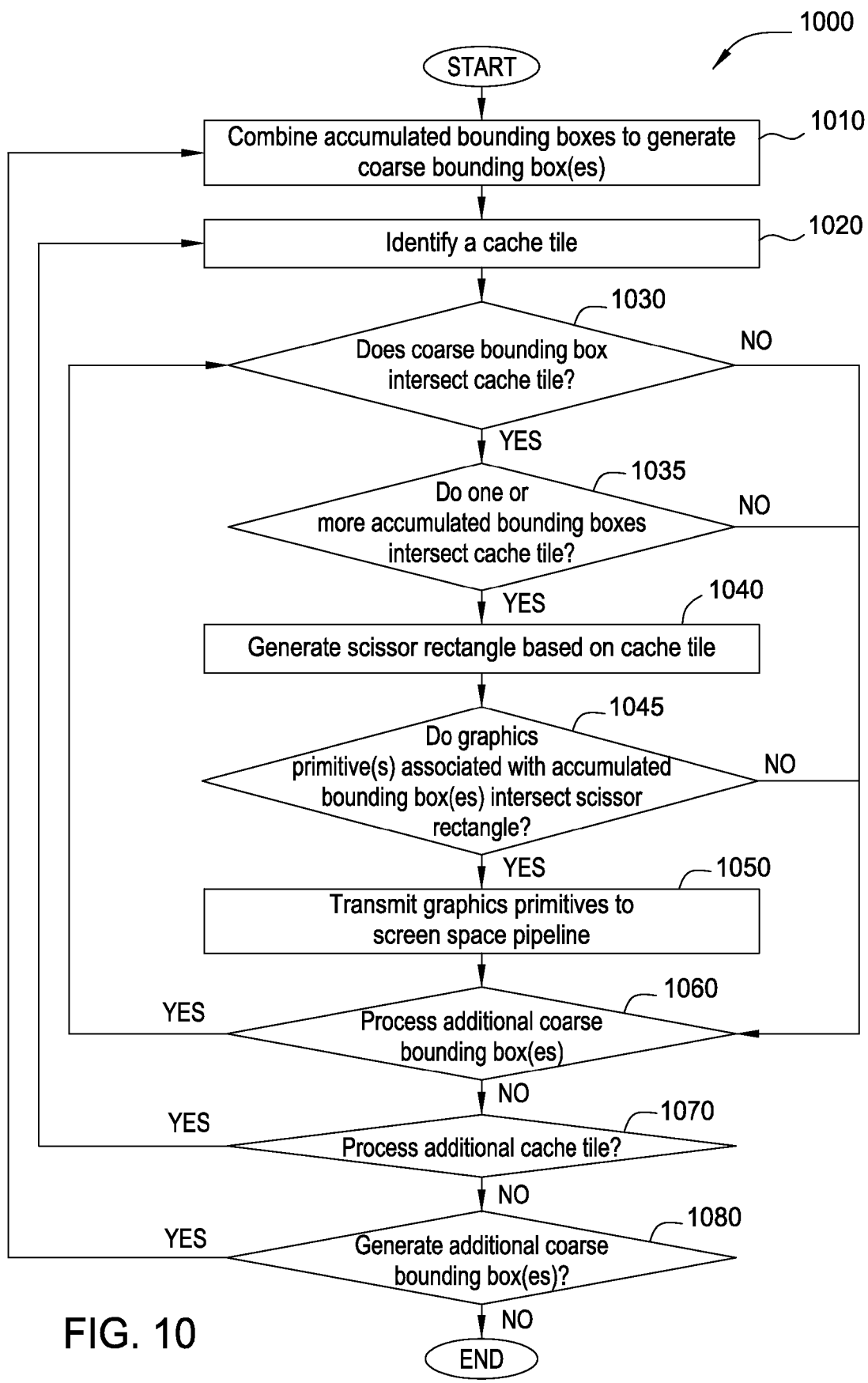
FIG. 10 is a flow diagram of method steps for performing a multi-pass tiling test, according to one embodiment of the present invention.

FIG. 10 is a flow diagram of method steps for performing a multi-pass tiling test, according to one embodiment of the present invention. Although the method steps are described in conjunction with the systems of FIGS. 1-4, persons skilled in the art will understand that any system configured to perform the method steps, in any order, falls within the scope of the present invention. Again, although the method steps are described in conjunction with accumulated bounding boxes received from the bounding box unit 372, the method steps are applicable to any type of bounding box generated in, or received by, any graphics processing pipeline.

As shown, a method 1000 begins at step 1010, where the tiling unit 375 combines multiple accumulated bounding boxes to generate one or more coarse bounding boxes. Each coarse bounding box may include bounding box coordinates, one or more indices to the accumulated bounding boxes and/or graphics primitives associated with the coarse bounding box, a count of the number of accumulated bounding boxes associated with the coarse bounding box, and/or a count of the number of graphics primitives associated with the coarse bounding box. Accumulated bounding boxes may be combined in the order that they are received from the bounding box unit 372. Additionally, when the bounding box unit 372 adds graphics primitives to each accumulated bounding box according to an API order, the coarse bounding box generated from the accumulated bounding boxes also may include graphics primitives stored in the API order.

Figure 11:
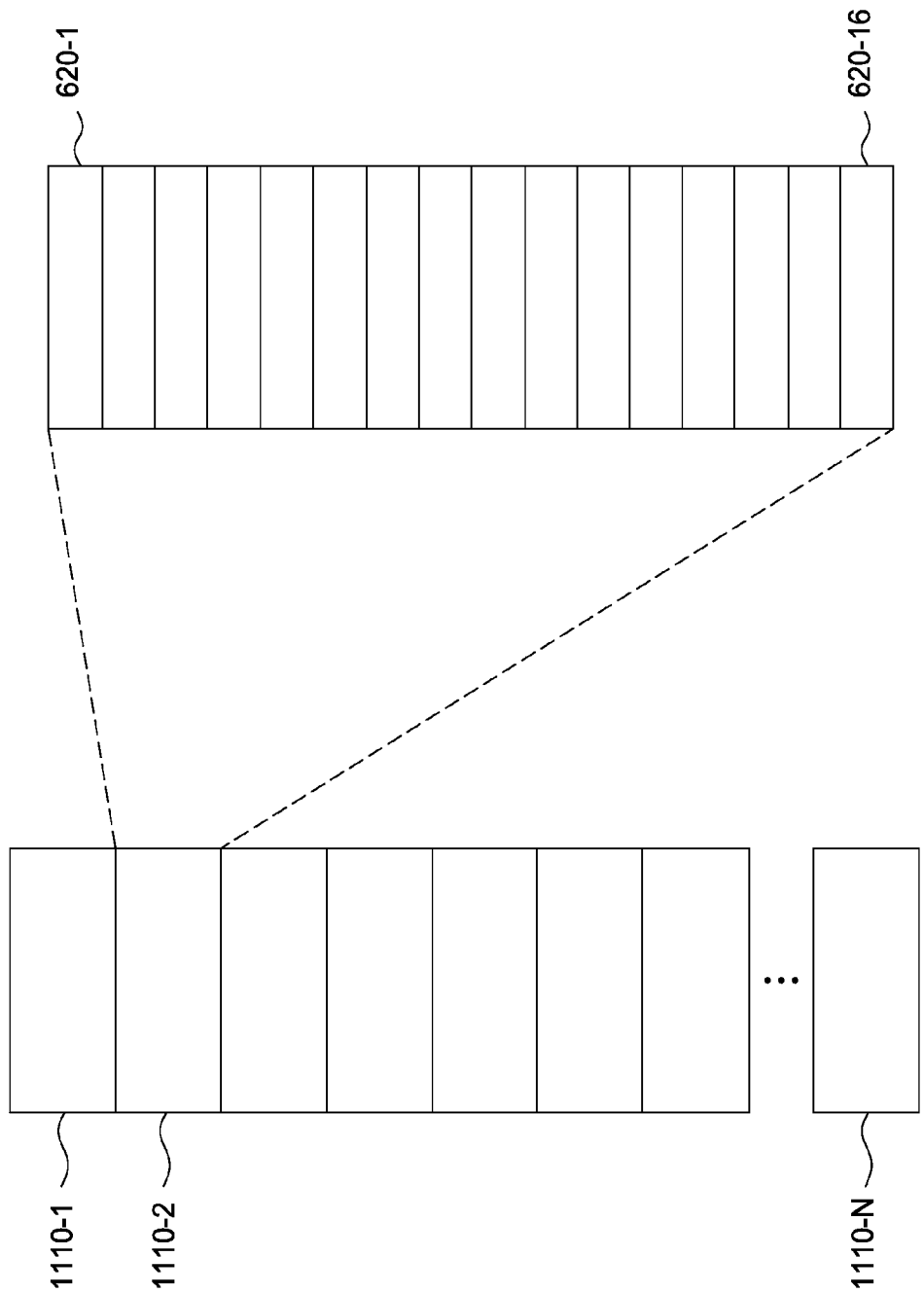
FIG. 11 is a conceptual illustration showing the relationship between a coarse bounding box and multiple accumulated bounding boxes, according to one embodiment of the present invention.

In general, any number of accumulated bounding boxes may be combined to generate each coarse bounding box. In one implementation, each coarse bounding box may include approximately 128 graphics primitives. Thus, if it is assumed that each accumulated bounding box includes approximately eight graphics primitives, then approximately 16 accumulated bounding boxes would be combined to generate each coarse bounding box. One example of this type of bounding box hierarchy is shown in FIG. 11, which is a conceptual illustration showing the relationship between a coarse bounding box 1110-2 and multiple accumulated bounding boxes 620, according to one embodiment of the present invention.

Coarse bounding boxes may be generated by combining accumulated bounding boxes until the coarse bounding box includes a threshold number of graphics primitives (e.g., 128 graphics primitives). In another implementation, accumulated bounding boxes are combined until the resulting coarse bounding box includes a threshold number of accumulated bounding boxes (e.g., 16 accumulated bounding boxes). In still other implementations, coarse bounding boxes may be generated by combining accumulated bounding boxes based on a heuristic or algorithm.

After generating one or more coarse bounding boxes at step 1010, the tiling unit 375 identifies a cache tile 410 at step 1020. At step 1030, the tiling unit 375 then determines whether a coarse bounding box intersects the cache tile 410. If the coarse bounding box does not intersect the cache tile 410, then none of the accumulated bounding boxes associated with the coarse bounding box intersects the cache tile 410. As a result, no further processing of the accumulated bounding boxes is performed with respect to the cache tile 410. At step 1060, the tiling unit 375 then determines whether to process an additional coarse bounding box.

If the coarse bounding box intersects the cache tile 410, then, at step 1035, the tiling unit 375 further determines whether each accumulated bounding box associated with the coarse bounding box intersects the cache tile 410. In order to determine which accumulated bounding boxes are associated with the coarse bounding box, the tiling unit 375 may reference an index stored in the coarse bounding box. Coarse bounding boxes and accumulated bounding boxes may be evaluated to determine whether the bounding boxes intersect the current cache tile 410 using a brute force method. For example, the tiling unit 375 may evaluate four coarse bounding boxes per cycle and/or four accumulated bounding boxes per cycle. If none of the accumulated bounding boxes intersects the cache tile 410, then, at step 1060, the tiling unit 375 determines whether to process an additional coarse bounding box.

If one or more accumulated bounding boxes included in the coarse bounding box intersect the cache tile 410, then, at step 1040, the tiling unit 375 generates a scissor rectangle. At step 1045, the tiling unit 375 determines whether each graphics primitive associated with the one or more accumulated bounding boxes (i.e., the accumulated bounding boxes that intersect the cache tile 410) intersect the scissor rectangle. In order to determine which graphics primitives are associated with a particular accumulated bounding box, the tiling unit 375 may retrieve the index and the count stored in the accumulated bounding box and/or coarse bounding box. The tiling unit 375 may then retrieve the count of consecutive graphics primitives from the buffer memory, starting at the index. Any graphics primitives that intersect the scissor rectangle are then transmitted to the screen space pipeline 354 for further processing at step 1050. If none of the graphics primitives intersect the scissor rectangle, then, at step 1060, the tiling unit 375 next determines whether to process an additional coarse bounding box.

Next, at step 1070, the tiling unit 375 determines whether to process an additional cache tile 410. If an additional cache tile 410 is to be processed, then the method 1000 returns to step 1020. If no additional cache tiles 410 are to be processed, then, at step 1080, the tiling unit 375 determines whether additional coarse bounding boxes are to be generated. If additional coarse bounding boxes are to be generated, then the method 1000 returns to step 1010. If no additional coarse bounding boxes are to be generated, then the method 1000 ends.

In sum, various techniques are disclosed for generating bounding boxes and performing tiling in a graphics processing system. In a technique for reducing the amount of data transmitted across the crossbar, a bounding box unit receives graphics primitives and determines whether to add each graphics primitive to an accumulated bounding box based on whether the graphics primitive is within a threshold distance of the accumulated bounding box. If the graphics primitive is not within a threshold distance of the accumulated bounding box, then the graphics primitive is added to a new accumulated bounding box, and the accumulated bounding box is transmitted across the crossbar. Further, if the graphics primitive is included in one or more different cache tiles than the previous graphics primitive, then the graphics primitive may be added to a new accumulated bounding box, and the accumulated bounding box may be transmitted across the crossbar.

Further, in a technique for tracking whether a particular cache tile likely includes graphics primitives, an accumulated bounding box is received from the world-space pipeline, and the tiling unit determines which cache tiles are intersected by the accumulated bounding box and stores the results in an array. By tracking which cache tiles are intersected by each incoming accumulated bounding box, cache tiles that do not include any graphics primitives may be skipped during subsequent rendering. The tiling unit may further combine the accumulated bounding boxes currently stored in the buffer memory to generate a global bounding box that may be referenced to verify whether any graphics primitives likely intersect the cache tile.

Finally, in a technique for reducing the number of intersection tests performed for a particular cache tile, accumulated bounding boxes received by the tiling unit are combined to generate coarse bounding boxes. During tiled rendering, the tiling unit then determines whether each coarse bounding box intersects the current cache tile. If a coarse bounding box intersects the current cache tile, then the tiling unit determines whether each accumulated bounding box included in the coarse bounding box intersects the cache tile. If an accumulated bounding box intersects the current cache tile, then the graphics primitives associated with the accumulated bounding box are transmitted for further processing.

One advantage of the disclosed technique is that, by analyzing the fine bounding boxes only after determining that the corresponding coarse bounding box intersects the current cache tile, the number of intersection calculations performed for each cache tile may be reduced. Additionally, coarse bounding boxes need to be generated only once and may be reused when visiting each cache tile during rendering, thereby increasing overall processing efficiency.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing a multi-pass tiling test, the method comprising:
    combining a plurality of bounding boxes to generate a coarse bounding box;
    determining that the coarse bounding box intersects a first cache tile;
    comparing each bounding box included in the plurality of bounding boxes against the first cache tile and identifying a first set of one or more bounding boxes included in the plurality of bounding boxes that intersects the first cache tile; and
    for at least one bounding box included in the first set of one or more bounding boxes, processing one or more graphics primitives associated with the at least one bounding box.

2. The method of claim 1, wherein processing the one or more graphics primitives associated with the at least one bounding box comprises:
    generating a scissor rectangle based on the first cache tile; and
    culling a first portion of the one or more graphics primitives based on the scissor rectangle.

3. The method of claim 2, wherein processing the one or more graphics primitives associated with the at least one bounding box further comprises transmitting, based on the scissor rectangle, a second portion of the one or more graphics primitives to a screen space pipeline.

4. The method of claim 1, wherein processing the one or more graphics primitives associated with the at least one bounding box comprises transmitting at least a portion of the one or more graphics primitives from a buffer to a screen space pipeline.

5. The method of claim 1, wherein the coarse bounding box includes a plurality of indices, and each index is associated with a different bounding box included in the plurality of bounding boxes.

6. The method of claim 1, wherein combining the plurality of bounding boxes to generate a coarse bounding box comprises accumulating bounding boxes until the coarse bounding box includes at least one of a threshold number of bounding boxes and a threshold number of primitives.

7. The method of claim 1, further comprising:
    determining that a second set of one or more bounding boxes included in the plurality of bounding boxes does not intersect the first cache tile; and
    determining not to process the second set of one or more bounding boxes.

8. The method of claim 1, further comprising:
    determining that the coarse bounding box does not intersect a second cache tile; and
    in response, not comparing each bounding box included in the plurality of bounding boxes against the second cache tile.

9. The method of claim 1, wherein the one or more graphics primitives associated with the at least one bounding box included in the first set of one or more bounding boxes are stored in application programming interface (API) order.

10. The method of claim 1, wherein at least one bounding box included in the plurality of bounding boxes comprises an accumulated bounding box that is associated with two or more graphics primitives.

11. A graphics processing pipeline, comprising:
    a screen space pipeline; and
    a tiling unit that:
        combines a plurality of bounding boxes to generate a coarse bounding box;
        identifies a first cache tile associated with a render surface;
        determines that the coarse bounding box intersects the first cache tile;
        compares each bounding box included in the plurality of bounding boxes against the first cache tile to determine that a first set of one or more bounding boxes included in the plurality of bounding boxes intersects the first cache tile; and
        for each bounding box included in the first set of one or more bounding boxes, processes one or more graphics primitives associated with the bounding box.

12. The graphics processing pipeline of claim 11, wherein processing the one or more graphics primitives associated with the bounding box comprises:
    generating a scissor rectangle based on the first cache tile; and
    culling a first portion of the one or more graphics primitives based on the scissor rectangle.

13. The graphics processing pipeline of claim 12, wherein processing the one or more graphics primitives associated with the bounding box further comprises transmitting, based on the scissor rectangle, a second portion of the one or more graphics primitives to the screen space pipeline.

14. The graphics processing pipeline of claim 11, wherein processing the one or more graphics primitives associated with the bounding box comprises transmitting at least a portion of the one or more graphics primitives from a buffer to the screen space pipeline.

15. The graphics processing pipeline of claim 11, wherein the coarse bounding box includes a plurality of indices, and each index is associated with a different bounding box included in the plurality of bounding boxes.

16. The graphics processing pipeline of claim 11, wherein combining the plurality of bounding boxes to generate a coarse bounding box comprises accumulating bounding boxes until the coarse bounding box includes at least one of a threshold number of bounding boxes and a threshold number of primitives associated with the plurality of bounding boxes.

17. The graphics processing pipeline of claim 11, wherein the tiling unit also:
   determines that a second set of one or more bounding boxes included in the plurality of bounding boxes do not intersect the first cache tile; and
   determines not to process the second set of one or more bounding boxes.

18. The graphics processing pipeline of claim 11, wherein the tiling unit also:
   identifies a second cache tile associated with the render surface;
   determines that the coarse bounding box does not intersect the second cache tile; and
   decides not to compare each bounding box included in the plurality of bounding boxes against the second cache tile.

19. The graphics processing pipeline of claim 11, wherein at least one bounding box included in the plurality of bounding boxes comprises an accumulated bounding box that is associated with two or more graphics primitives.

20. A computing device, comprising:
   a memory; and
   a graphics processing pipeline that includes:
      a screen space pipeline; and
      a tiling unit that:
         determines that a coarse bounding box intersects a first cache tile;
         compares at least a first bounding box included in the coarse bounding box against the first cache tile to determine that the at least a first bounding box intersects the first cache tile; and
         process one or more graphics primitives associated with the at least a first bounding box.

* * * * *